Feb. 3, 1970 C. H. LA LONDE ET AL 3,493,025
ATTACHMENT DEVICE FOR APERTURED STRUCTURAL MEMBERS
Filed April 1, 1968
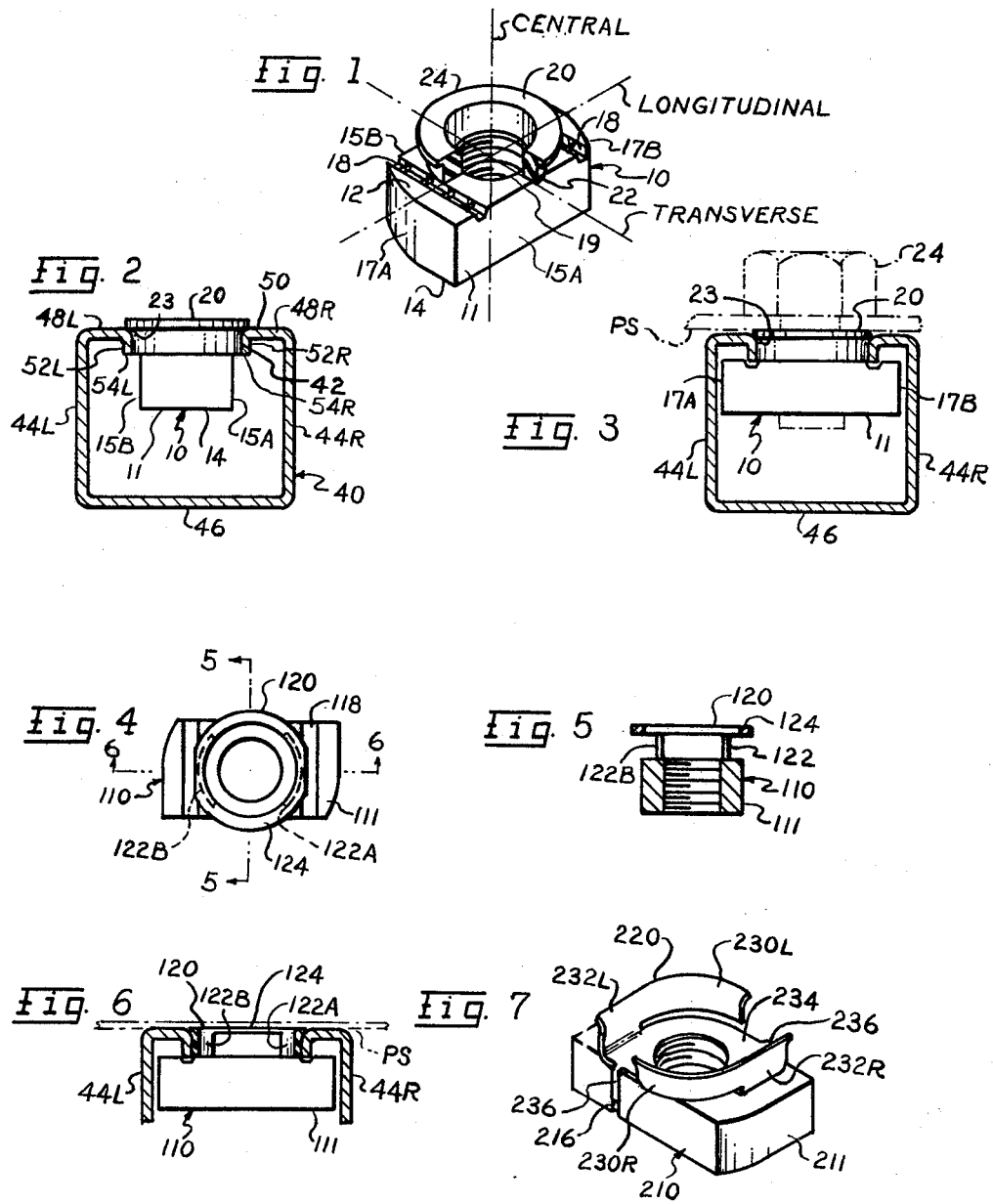
INVENTORS:
CARL H. LA LONDE
JAMES H. VAN HUFFEL
by John Stelman
THEIR ATTORNEY

United States Patent Office 3,493,025
Patented Feb. 3, 1970

3,493,025
ATTACHMENT DEVICE FOR APERTURED
STRUCTURAL MEMBERS
Carl Henry LaLonde and James Howard Van Huffel, Warren, Ohio, assignors to The Youngstown Sheet and Tube Company, Mahoning County, Ohio, a corporation of Ohio
Filed Apr. 1, 1968, Ser. No. 717,881
Int. Cl. F16b 39/00, 1/00; E04b 1/00
U.S. Cl. 151—41.75                               7 Claims

ABSTRACT OF THE DISCLOSURE

An attachment device including a first fastening member having friction engagement means extending therefrom and adapted to frictionally engage the sidewall portions of a structural element, which sidewall portions define a slotted opening, the frictional engagement positioning said first fastening member to facilitate mating with a complementary second fastening member. Preferably, the first fastening member is in the form of a nut having an upstanding member extending from an obverse side, the upstanding member having wall portions defining friction engagement means for engagement with the internally turned flanges of a channel member having a generally U-shaped cross section, the friction means serving to deter sliding of the said attachment device, particularly due to its own weight when the channel is in a vertical position.

BACKGROUND OF THE INVENTION

This invention generally relates to attachment devices, such as nuts and bolts, in combination with apertured structural members and for securing thereto other devices or structural elements.

The improved attachment device of this invention is particularly adapted for use in connection with structural channel elements which have a generally U-shaped cross section with inwardly-turned flanges, which flanges define bearing seats for supporting loads. These structural elements may be employed as struts, which are sometimes cast in concrete; they may also be used as columns, cross members, etc. in the construction of storage racks and the like; or they may form simple support members for hanging other elements. Sometimes, it is desirable to additionally employ these channels as raceways or conduits for threaded wires and the like.

Prior art attachment devices, adapted for use with slotted structural elements and to facilitate the threading of a complementary fastening member, are exemplified by the disclosure in U.S. Patent 2,696,139 to C. W. Attwood. There is disclosed a nut having a pair of serrated grooves, in what may be termed an obverse side of the nut. On a reverse side of the nut is mounted a compression or press-working spring. When the attachment device is inserted in a channel member, the spring seats on the bottom of the channel and urges the nut into engagement with the inwardly-turned flanges of the channel member. Consequently, with each different depth channel a correspondingly different length of spring is required. Such devices are susceptible to tilting, and subsequent falling out of place into the channel, when pressure is applied to the obverse side or face of the nut by means of a misaligned bolt. Since the spring seats on the bottom of the channel, the spring and nut necessarily occupy the full depth of the channel. This deters the additional use of such channels as raceways for wires and the like.

OBJECTS AND SUMMARY OF THE INVENTION

It is an object of this invention to provide an improved attachment device including a first fastening member to facilitate securing with a second and complementary fastening member, when used in connection with an apertured structural member.

It is another object of this invention to provide an improved attachment device which is adapted for use with channel members of any depth.

A further object of this invention is to provide an attachment device which does not occupy the full depth of a channel member; thus adapting the channel member for use both as a structural support member and a raceway.

A still furhter object of this invention is to provide the combination of a slotted channel member with an attachment device in an arrangement which relies upon a different mode of retentive positioning of the attachment device, which attachment device includes a first fastening member, to position the first fastening member in a manner whereby threading with a complementary second fastening member is facilitated.

Briefly, the objects are attained by providing an attachment device, for combination with an apertured structural member, which devices embodies a first fastening member (such as a bolt or nut), an upstanding engagement membr extending from an obverse face of said first fastening member, and said upstanding member including friction engagement means on opposed portions along vertical extents thereof. Preferably, said first fastening member comprises an elongated nut having a pair of parallel grooves in its obverse side and on opposing sides of and transverse to a threaded aperture of the nut; most preferably, said upright member has a ferrule-like configuration and defines opposing friction engagement surfaces, which surfaces are spaced along the longitudinal extent of the obverse face of said elongated nut; the spacing between said surfaces being less than the longitudinal extent of said face but greater than the transverse extent of said face, so as to adapt the engagement surfaces for interference fit or frictional engagement with the internally turned flange portions of a channel structural member.

DESCRIPTION OF THE DRAWING

The invention will be more fully understood and further objects and advantages thereof will become apparent when reference is made to the following detailed description and to the accompanying drawing, in which:

FIG. 1 is an isometric view of a preferred embodiment of an attachment device (female type) of this invention;

FIG. 2 is a cross-sectional elevational view of the attachment device shown in FIG. 1, in combination with a channel structural member and with the fastening member in a preindexed position;

FIG. 3 is a view similar to that shown in FIG. 2 but with the attachment device in an indexed position (90° from that shown in FIG. 2);

FIG. 4 is a plan view of another embodiment of this invention;

FIG. 5 is a cross-sectional view taken along line 5—5 of FIG. 4;

FIG. 6 is a cross-sectional view of the attachment device shown in and taken along line 6—6 of FIG. 4, in combination with a view of a structural channel member; and FIG. 7 is an isometric view of another alternate embodiment of the attachment device of this invention.

DESCRIPTION OF PREFERRED EMBODIMENTS

Referring to FIG. 1, the preferred attachment member 10 therein shown comprises a nut 11 having an obverse de 12 and a reverse side 14, and a ferrule member 20 positioned on said obverse side 12. The ferrule member ) is suitably secured to the nut 11, such as by cementing.

The nut is preferably of the elongated type, i.e., it is longer in a first direction (corresponding to a longitudinal axis) than in a second direction (corresponding to transverse axis). The nut 11, also preferably, has positioning means in the form of a pair of serrated parallel ots 18, which are transverse to said longitudinal extent and in laterally spaced relation with the threaded opening 9, coaxial with the central axis of the nut 11, which central axis is generally normal to the obverse 12 and reverse 4 sides. The opening 19 is adapted to receive the threaded ortion of a complementary fastening member. The preferred form of nut 11 may be further described as having mutually opposing side faces 15A and 15B and mutually pposing end faces 17A and 17B.

The ferrule 20, shown in FIG. 1, has an upstanding 'all portion 22 and a peripheral flange 24. The wall 22 shown to be continuous in form; however, it will be understood that it is only necessary to provide laterally pposing friction engagement surface portions, which are paced apart along said longitudinal extent. The outside urfaces of opposing portions of wall 22 are spaced apart distance, greater than the transverse extent of the nut 11, ufficient to provide an interference fit when the nut 10 ; placed in an indexed position as shown in FIG. 3.

Referring to FIG. 2, it will be seen that the attachment evice is positioned between the interiorly turned flange ortions of channel member 40. The channel 40 is shown o have a U-shaped cross-sectional configuration. For urposes of description, the mutually opposing vertical ortions 33R and 44L may be termed the legs 44 of the J and the interconnecting web 46 may be termed the base. he flange portions 48R and 48L extend inwardly from egs 44R and 44L, respectively, and define therebetween the lotted opening 42 into which the attachment device 10 s inserted. The flanges 48R and 48L also form the obverse ide 50 of the structural element 40, and have respective ip portions 52R and 52L extending therefrom, interiorly of the element 40. The terminals of lip portions 52 provide landings or bearing surfaces 54R and 54L for receiving the attachment device 10. Preferably, these landings are received by the slots or grooves 18 of the nut 11 when he nut is indexed or home position.

As may be further seen in FIG. 2, the attachment device l0 is inserted, reverse, side first, between the lip portions 52 and with the longitudinal extent of the nut 11 corresponding to the longitudinal extent of the opening 42 intil the underside 23 of the flange 24 engages the lip portions 52. At this stage, the wall 22 of the ferrule 20 nay or may not, optionally, frictionally engage the lip portions 52R and 52L. The nut 11 is then rotated 90° to the indexed position, as shown in FIG. 3. It is only essential that the friction engagement surface portions of ferrule 20 establish frictional engagement with the lip portions 52 of flanges 48 in the indexed position. In the indexed position, the ferrule is in sufficient frictional contact to deter sliding of the nut 10 during further assembly with a complementary fastening member, bolt 24 (shown in phantom lines).

It will be understood that the frictional engagement element may be fabricated from any suitable material such as metal, rubber and rubber-like materials, and plastics, preferably those plastics which have some resiliency. In all of the embodiments it is preferred to so dimension the frictional engagement element so that the element and the attached nut may be freely inserted between the flanges of the channel member. However, in the case where a resilient material is used, the element may have the configuration of a cylinder. It is only important that the frictional engagement element have a laterial width extending in the same direction as the longitudinal extent of the nut so as to provide an interference fit when the attachment device is in the indexed position.

An alternate attachment device 110 of this invention is illustrated in FIGS. 4, 5, and 6. The ferrule 120 therein shown is similar in many respects to that illustrated in the embodiment of FIG. 1. However, the ferrule 120 is modified to the extent that the flange 124 does not have the same lateral width throughout the periphery of the ferrule 120. The flange 124 is foreshortened along the sides of the ferrule corresponding to the longitudinal extent of the nut 11 and in a direction corresponding to the transverse extent. As may be seen in FIG. 6, a reduced amount of material overlaps the channel member 40 when the device 110 is inserted in the opening 142. Consequently, any planar surface PS may establish more intimate contact with the obverse face 50 of the channel 40. The ferrule 120 has also been modified to the extent that the lateral wall 122 does not extend through the periphery of the ferrule. The wall 122 defines laterally opposing leg portions 122A and 122B which are spaced apart along the longitudinal extent of nut 110 a distance greater than the transverse extent of the nut 110.

Each of the modifications shown in FIGS. 4 and 5 may be individually or collectively employed to modify the device illustrated in FIG. 1.

FIG. 7 illustrates a further alternate embodiment of attachment device 210. There the frictional engagement element takes the form of a metallic spring-like member 220 having legs 230R and 230L. Legs 230R and 230L establish initial contact with the flange portions of a channel member when first installed. After the attachment device 210 is rotated 90° into home position, the friction retention portions 232R and 232L establish frictional contact with the flanges. The legs 230 are secured to a common base member 234 having appendages 236 extending therefrom for securing to nut 211. The appendages 236 fit into the slots 216 of the nut 211 and then the sidewalls defining the slots 216 are peened over to lock in the appendages 236 and member 220.

What is claimed is:
1. An attachment device, for insertion between a pair of interiorly turned flanges of a structural element, said device comprising:
 (a) an elongated fastening member having an obverve side, a reverse side, a longitudinal axis, and a transverse axis;
 (b) friction retention means on said obverse side, said means being separate from but secured to said member and having mutually opposing friction engagement surface portions on said obverse side and on opposite sides of said transverse axis, which portions are more pressure responsive than said member;
 (c) flange means extending laterally away from said engagement surface portions and generally in the same direction as, but spaced from, said obverse side of said fastening member; and
 (d) said device being adapted for insertion reverse side first and for positioning said friction engagement surface portions, between and in engagement with said flanges when said device is in an indexed position.

2. An attachment device as described in claim 1, wherein:
 (a) said flange means forms a peripheral flange portion extending from said surface portions of said retention member, the underside of said flange portion forming a seating plane which is generally parallel to said obverse side.

3. An attachment device as described in claim 1, wherein:
 (a) said surface portions are generally arcuate.

4. An attachment device, for insertion between opposing interiorly turned flanges of a structural element, said device comprising:
 (a) a fastening member having an obverse side, a reverse side, a longitudinal axis and a transverse axis, and a pair of generally parallel grooves on said obverse side mutually opposing each other on opposite sides of a central axis of said member;

(b) friction retention means on said obverse side, including friction engagement surface portions on said obverse side transverse to said longitudinal axis and mutually opposing each other on said opposite sides, corresponding to those of said grooves, to position said grooves for receipt of said flanges when said device is in an installed and indexed position;

(c) the spacing between said surface portions, as measured along said longitudinal axis, being greater than the width of said fastening member, as measured along said transverse axis, but less than the length of said fastening member, as measured along said longitudinal axis; and (d) flange means extending laterally away from said engagement surface portions and generally in the same direction as, but spaced from, said obverse side of said fastening member.

5. An attachment device as described in claim 4, wherein:

(a) each of said grooves has an inside edge and an outside edge; and (b) the diameter of said peripheral flange portion is greater than the spacing between the inside edges of said grooves but less than the spacing between the outside edges of said grooves.

6. In combination with a channel structural element having a generally U-shaped configuration with the opening between the legs of the channel being at an obverse side and with the legs of the channel being interiorly turned to define flange portions, an attachment device comprising:

(a) an elongated fastening portion having an obverse side and a reverse side, mutually opposing side faces a longitudinal axis, a transverse axis, mutually opposing end faces, and a central axis generally normal to said obverse side and to said reverse side, a pair of grooves on said side and transverse to said longitudinal axis; and (b) a friction retention portion on said obverse side having engagement surface portions mutually engaging said flange portions of said structural element, said surface portions of said retention member generally mutually opposing each other from opposite sides of said central axis corresponding to said opposing side faces and being spaced apart a distance greater than the distance between said side faces but less than the distance between said end faces; and (c) the friction between said surface portions and said flange portions being sufficient to position said attachment device between said flange portions to facilitate engagement with a complementary fastening member and to deter sliding of said attachment device.

7. In combination, with a structural element having terminal interiorly turned flange portions defining a slotted opening, an attachment device comprising:

(a) a threaded elongated fastening member having an obverse side and a reverse side, suspended from said flange portions, reverse side first, the elongated extent of said member being greater than the width of said opening between said flange portions;

(b) friction retention means on said obverse side, including friction engagement surface portions on said obverse side and engaging lateral sides of said flange portions, said retention means being resiliently compressed between said lateral sides of said flange portions and suspending said member within said element; and (c) flange means extending laterally away from said engagement surface portions and generally in the same direction as, but spaced from, said obverse side of said fastening member.

References Cited

UNITED STATES PATENTS

| 2,975,814 | 3/1961 | Tinnerman | 85—80 |
| 2,172,827 | 9/1939 | Becker. | |
| 2,345,650 | 4/1944 | Attwood | 85—32 |
| 3,150,703 | 9/1964 | Preziosi | 85—32 |

FOREIGN PATENTS

| 1,494,307 | 7/1967 | France. |
| 782,428 | 9/1957 | Great Britain. |
| 853,581 | 11/1960 | Great Britain. |
| 1,175,966 | 11/1958 | France. |

EDWARD C. ALLEN, Primary Examiner

U.S. Cl. X.R.

52—710; 287—189.36